F. VACHER.
TIRE PROTECTOR.
APPLICATION FILED DEC. 19, 1908.

942,682.

Patented Dec. 7, 1909.

WITNESSES:
William Miller
Christian Almstaedt

INVENTOR
Francisque Vacher
BY
W. C. Hauff
ATTORNEY

UNITED STATES PATENT OFFICE.

FRANCISQUE VACHER, OF NEW YORK, N. Y.

TIRE-PROTECTOR.

942,682.

Specification of Letters Patent.   Patented Dec. 7, 1909.

Application filed December 19, 1908.   Serial No. 468,299.

*To all whom it may concern:*

Be it known that I, FRANCISQUE VACHER, a citizen of the French Republic, residing at New York, in the county of New York and State of New York, have invented new and useful Improvements in Tire-Protectors, of which the following is a specification.

The protector serves to envelop pneumatic tires for cycles or automobiles.

The protector is shown in the annexed drawing in which:—

Figure 1:
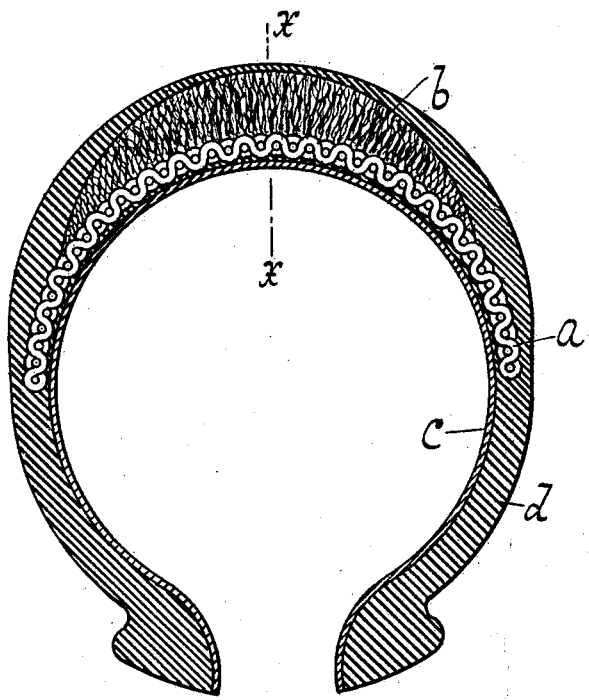
Figure 2:
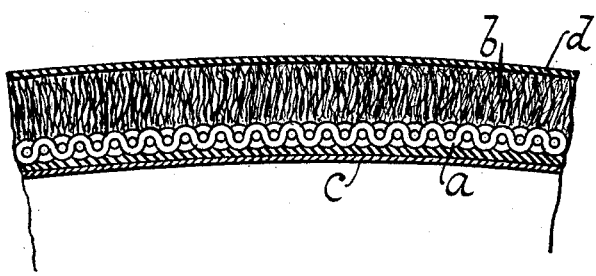

Figure 1 shows a cross section of a tire embodying this invention. Fig. 2 is a section along line $x\ x$ Fig. 1.

The protector is composed of a metallic webbing $a$ woven from steel threads. Into this webbing are woven a number of very fine and flexible steel threads forming the felting $b$ in such manner that the webbing $a$ and felting $b$ form only one single mass of matting inseparable and homogeneous.

At $c$ is indicated a canvas backing or foundation and a mass of caoutchouc $d$ is vulcanized to the canvas and about the metallic webbing $a$ and threads or felting $b$. The webbing and felting are embedded in the mass of vulcanized caoutchouc $d$ the felting being of a crescent shape in cross section at the tread.

The protector $a\ b$ serves to reinforce the pneumatic tire of caoutchouc making the same better adapted to resist the different substances encountered on the road and thus prolong the durability. The steel thread felting $b$ hinders cutting and perforating objects from entering the surface of the tire except to a very slight extent. The metallic felting $b$ at the surface of the crescent or tread where the caoutchouc layer thins or tapers comes into direct contact with the ground together with the caoutchouc and increases the adhesion and diminishes the risks of skidding and the wearing out of the caoutchouc.

What I claim is:—

A tire protector comprising a metallic webbing with a canvas support or backing, metallic threads having parts woven into the webbing leaving parts thereof free to project, and a mass of caoutchouc vulcanized to the canvas and about the metallic webbing and threads to embody the whole.

In testimony whereof I have hereunto set my hand in the presence of two subscribing witnesses.

FRANCISQUE VACHER.

Witnesses:
 W. C. HAUFF,
 CHRISTIAN ALMSTAEDT.